W. RAWALT.
FARRIER'S IMPLEMENT.
APPLICATION FILED DEC. 9, 1908.
940,478.
Patented Nov. 16, 1909.
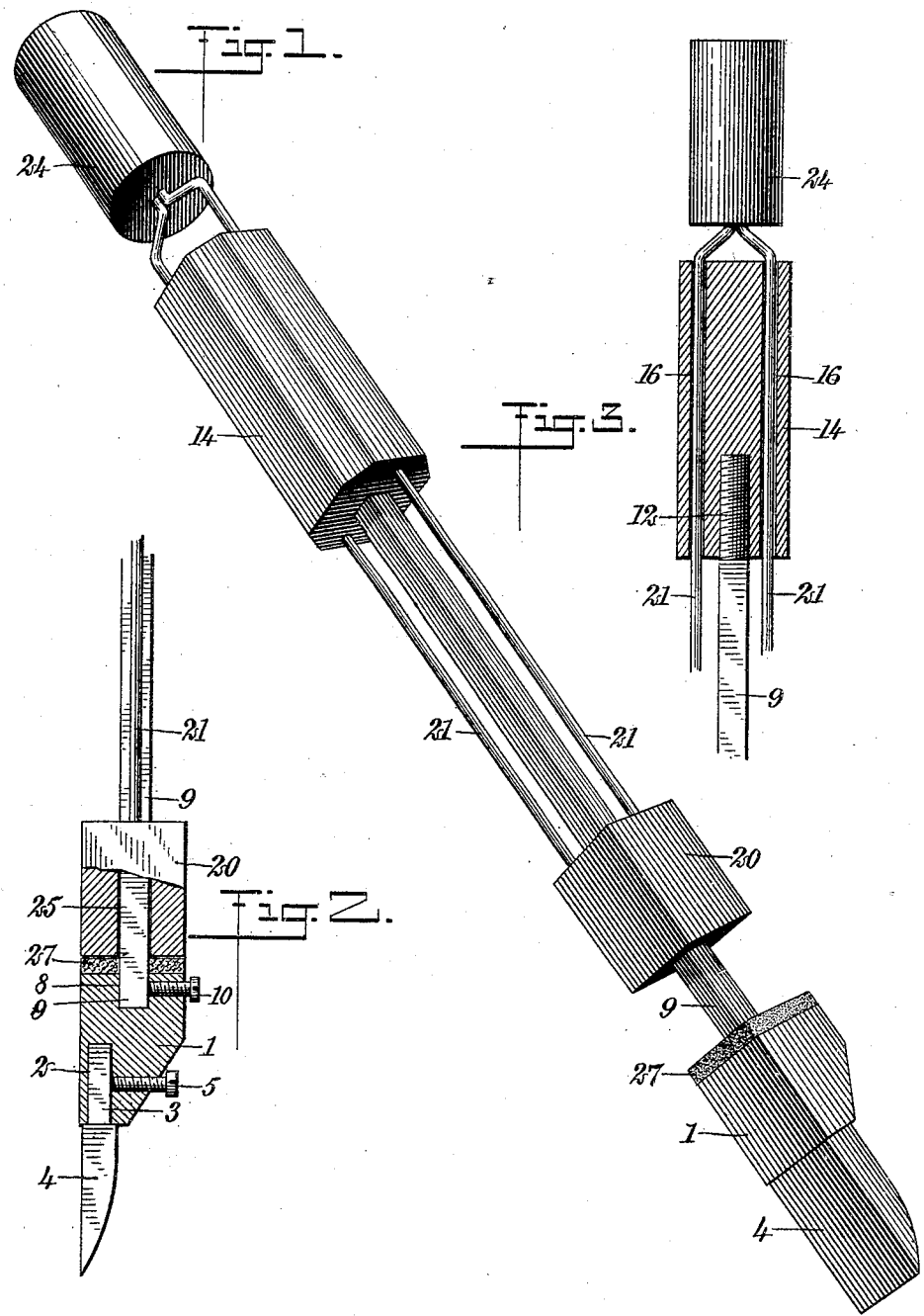
WITNESSES
INVENTOR
Warren Rawalt
BY Munn &Co
ATTORNEYS

UNITED STATES PATENT OFFICE.

WARREN RAWALT, OF BLANDINSVILLE, ILLINOIS.

FARRIER'S IMPLEMENT.

940,478.  Specification of Letters Patent.  Patented Nov. 16, 1909.

Application filed December 9, 1908. Serial No. 466,687.

*To all whom it may concern:*

Be it known that I, WARREN RAWALT, a citizen of the United States, and a resident of Blandinsville, in the county of McDonough and State of Illinois, have invented a new and Improved Farrier's Implement, of which the following is a full, clear, and exact description.

This invention relates to an improvement in farriers' implements, by means of which a horse's hoof may be quickly and properly trimmed.

The object of the invention is to provide a tool with a chisel and a movable hammer head, whereby said chisel may be more readily operated to trim the hoof.

The invention consists in the construction and combination of parts, to be more fully described hereinafter, and particularly set forth in the claims.

Reference is to be had to the accompanying drawings forming a part of this specification, in which similar characters of reference indicate corresponding parts in all the views, and in which—

Figure 1 is a perspective view, showing my improved form of implement complete; Fig. 2 is a view, partially in section, of the tool-holder in the lower portion of the implement; and Fig. 3 is a view, partially in section, of the upper portion of the implement.

The implement comprises a tool-holder or chisel-head 1, having a socket 2 in its lower end, for the reception of a shank 3 of a chisel 4. Said shank is adapted to be held in position by means of a set-screw 5. The upper end of the tool-holder 1 is provided with a recess or socket 8, for the reception of a stem 9, which may be held in position by a set-screw 10. The upper end of the stem 9 may be screw-threaded at 12, for connection with a handle 14. Said handle is shown octagonal in the present instance, but obviously any other suitable form may be employed. Said handle 14 is provided with a pair of passages 16 extending longitudinally through the same, which act as guides for the handle which operates the hammer-head.

The hammer comprises a head 20, to which a pair of rods 21 are secured, said rods passing through the passages 16 in the handle 14, and are fastened in their upper ends in the handle 24. The head 20 is provided with a central passage 25, in order to enable the head to be reciprocated along the stem 9 by means of the handle 24 and the rods 21 connected thereto.

The upper end of the tool-holder 1 may be provided with a buffer 27, which may be made of leather or any other suitable material.

The operation of the implement is as follows: The handle 14 may be grasped in one hand to direct the tool, said handle being connected to said tool by the stem 9 with the tool-holder 1. The hammer 20 may be reciprocated by means of the handle 24 and the rods 21 connecting said handle to said head, said handle 24 being grasped by the other hand of the operator. By varying the distance through which the hammer-head is caused to travel, the force of the blow upon the hoof may be regulated.

Having thus described my invention, I claim as new and desire to secure by Letters Patent:—

1. A farrier's implement, comprising a tool holder having a stem projecting therefrom, a handle on the end of the stem and in alinement therewith, a reciprocating hammer head on the stem between the handle thereof and the tool holder, and a handle connected with the hammer head, said handle being in alinement with the handle of the stem and guided in its movements by the handle of the stem.

2. A farrier's implement, comprising a tool-holder, a stem on said holder, a hammer-head slidably mounted on said stem, a handle secured to said stem and provided with guides, a handle for reciprocating said hammer-head, and means for connecting said hammer-head and operating handle, said means coöperating with said guides.

3. A farrier's implement, comprising a tool-holder, a stem on said holder, a hammer-head slidably mounted in said stem, a handle on said stem having guides formed therein, a handle for reciprocating said hammer-head, and rods connecting said hammer-head and its handle and passing through said guides.

4. A farrier's implement, comprising a tool-holder, a tool removably attached to said holder, a stem secured to said tool-holder, a handle on said stem having guides formed therein, a handle for reciprocating said hammer head, and a pair of rods attached to said hammer-head and its operating handle and passing through said guides.

5. A farrier's implement, comprising a tool-holder, a handle rigidly connected thereto, a slidably mounted hammer-head, and a handle connected thereto for reciprocating the same, said tool handle forming a guide for said hammer-head and provided with independent means for guiding said operating handle.

In witness whereof I have signed my name to this specification in the presence of two subscribing witnesses.

WARREN RAWALT.

Witnesses:
 MABEL M. STEPHENS,
 JOHN HUSTON.